(12) United States Patent
Hudson, Jr. et al.

(10) Patent No.: US 7,512,485 B2
(45) Date of Patent: Mar. 31, 2009

(54) METHOD FOR ROUTING MULTIPLE PATHS THROUGH POLYGONAL OBSTACLES

(75) Inventors: Thomas Randall Hudson, Jr., Cary, NC (US); Michael Whitney Sorenson, Prairie Village, KS (US)

(73) Assignee: International Business Machines Corporation, Armonk, NY (US)

( * ) Notice: Subject to any disclaimer, the term of this patent is extended or adjusted under 35 U.S.C. 154(b) by 689 days.

(21) Appl. No.: 11/093,336

(22) Filed: Mar. 29, 2005

(65) Prior Publication Data
US 2006/0224304 A1    Oct. 5, 2006

(51) Int. Cl.
*G01C 21/00* (2006.01)
(52) U.S. Cl. .................. 701/202; 701/201; 701/25; 342/357.02
(58) Field of Classification Search ......... 701/201–202, 701/25, 214; 711/4; 342/357.01; 455/456.3
See application file for complete search history.

(56) References Cited

U.S. PATENT DOCUMENTS

| | | | |
|---|---|---|---|
| 4,764,873 A | 8/1988 | Libby | 364/461 |
| 5,349,533 A | 9/1994 | Libby | 364/461 |
| 5,486,822 A * | 1/1996 | Tenmoku et al. | 340/995.22 |
| 5,491,641 A | 2/1996 | Scepanovic et al. | 364/491 |
| 5,615,128 A | 3/1997 | Scepanovic et al. | 364/489 |
| 5,648,901 A * | 7/1997 | Gudat et al. | 701/23 |
| 5,684,476 A * | 11/1997 | Anderson | 340/988 |
| 5,835,684 A | 11/1998 | Bourne et al. | 395/90 |
| 5,955,973 A * | 9/1999 | Anderson | 340/988 |
| 5,963,948 A * | 10/1999 | Shilcrat | 707/100 |
| 5,974,347 A * | 10/1999 | Nelson | 701/22 |
| 5,995,902 A * | 11/1999 | Monson | 701/202 |
| 6,049,756 A | 4/2000 | Libby | 701/301 |
| 6,128,574 A * | 10/2000 | Diekhans | 701/209 |
| 6,205,381 B1 * | 3/2001 | Motz et al. | 701/25 |

(Continued)

FOREIGN PATENT DOCUMENTS

DE    60025725 T2 *  11/2006

(Continued)

OTHER PUBLICATIONS

UAV Swarm Mission Planning and Routing using Multi-Objective Evolutionary Algorithms; Lamont, G.B.; Slear, J.N.; Melendez, K.; Computational Intelligence in Multicriteria Decision Making, IEEE Symposium on; Apr. 1-5, 2007 pp. 10-20; Digital Object Identifier 10.1109/MCDM.2007.369410.*

(Continued)

*Primary Examiner*—Cuong H Nguyen
(74) *Attorney, Agent, or Firm*—Yee & Associates, P.C.; Martin J. McKinley

(57) ABSTRACT

The present invention provides a method, system and computer program product for routing multiple paths through polygonal obstacles. In a preferred embodiment, the method begins by offsetting the initial paths through the obstacles from the obstacles to form adjusted paths. If it is determined that any adjusted path encounters a new intersection, the adjusted path or paths are modified to form revised paths. The vertices of each obstacle are labeled. All the revised and all the adjusted paths are sorted. Then, according to their sorted order, the revised and the adjusted paths are reconstructed to form offset paths.

17 Claims, 13 Drawing Sheets

U.S. PATENT DOCUMENTS

| | | | |
|---|---|---|---|
| 6,240,342 B1 * | 5/2001 | Fiegert et al. | 701/25 |
| 6,263,277 B1 * | 7/2001 | Tanimoto et al. | 701/209 |
| 6,445,983 B1 * | 9/2002 | Dickson et al. | 701/23 |
| 6,473,083 B1 | 10/2002 | Suzuki et al. | 345/426 |
| 6,542,469 B1 | 4/2003 | Kelley et al. | 370/238 |
| 6,604,005 B1 * | 8/2003 | Dorst et al. | 700/56 |
| 6,804,199 B1 | 10/2004 | Kelly et al. | 370/238 |
| 6,907,336 B2 * | 6/2005 | Gray et al. | 701/50 |
| 2004/0068352 A1 * | 4/2004 | Anderson | 701/25 |

FOREIGN PATENT DOCUMENTS

| | | | |
|---|---|---|---|
| EP | 1198273 B1 * | 1/2006 | |
| JP | 04365088 A * | 12/1992 | |
| JP | 11219105 A * | 8/1999 | |
| JP | 2005017052 A * | 1/2005 | |
| JP | 02005110153 A * | 4/2005 | |
| KR | 2006092565 A * | 8/2006 | |
| WO | WO 9619775 A1 * | 6/1996 | |

OTHER PUBLICATIONS

A Complete System for High-Speed Navigation of Prescribed Routes; Urmson, C.; Gutierrez, A.; Miller, N.; Peterson, K.; Spiker, S.; Struble, J.; Whittaker, W.; Intelligent Robots and Systems, 2006 IEEE/RSJ International Conference on; Oct. 2006 pp. 537-542; Digital Object Identifier 10.1109/IROS.2006.282178.*

A new horizontal collision detection scheme for avatar with avatar in collaborative virtual environment;Chun-Yan Yu; Dong-Yi Ye; Ming-Hui Wu; Yun-He Pan;;Machine Learning and Cybernetics, 2005. Proceedings of 2005 International Conference on vol. 8, Aug. 18-21, 2005 pp. 4961-4966 vol. 8;Digital Object Identifier 10.1109/ICMLC.2005.1527817.*

A new navigation/traveling method in virtual environment (intelligent cruise control navigation); Kwon, T.; Kim, T.; Yoon-Chul Choy; TENCON 99. Proceedings of the IEEE Region 10 Conference; vol. 1, Sep. 15-17, 1999 pp. 348-351 vol. 1 Digital Object Identifier 10.1109/TENCON. 1999.818422.*

An object-oriented traffic simulation with IVHS applications; McGurrin, M.F.; Wang, P.T.R.; Vehicle Navigation and Information Systems Conference, 1991; vol. 2, Oct. 20-23, 1991 pp. 551-561.*

Bose, "GPS/PLRS Aided Inertrial Land Navigation System Performance," IEEE Plans '86 Position Location and Navigation Symposium, Nov. 4-7, 1986, Las Vegas, pp. 496-504, cited by others.*

La Mioigne, "Domain-Dependent Reasoning for Visual Navigation of Roadways," IEEE Journal of Robotics & Automation, vol. 4, No. 4, Aug. 1988, New York, pp. 419-427, cited by others.*

Proceedings 1987 IEEE International Conference on Robotics and Automation, Journal of Robotics and Automation, Mar. 31-Apr. 3, 1987, Raleigh, vol. 2, pp. 1121-1130, cited by others.*

"Smooth Local Path- Planning for Autonomous Vehicles" by Katayama, et al., Center for Robotic Systems, CA, Mar. 1988, cited by others.*

Conway et al., "Tele-Autonomous Systems: Methods and Architectures for Intermingling Autonomous and Telerobotic Technology," Proceedings 1987 IEEE International Conference on Robotics and Automation, Journal of Robotics and Automation, Mar. 31-Apr. 3, 1987, Raleigh, vol. 2, pp. 1121-1130, cited by others.*

Geoffrey Shropshire et al., Field Experience with Differential GPS, ASAE/CSAE Presentation, Jun. 20-23, 1993, cited by others.*

Dorst et al.—"The Constrained Distance Transformation: a Pseudo-Euclidean Recursive Implementation of the LEE-Algorithm", Signal Processing III: Theories and Applications;Elsevier Science Publishers B. (North Holland);1986; p. 917-920, cited by others.*

Tak-Lap Tsui, A Prototype Design of a Computer-Controlled Spreader System for Prescription Farming Technology, Master of Science Thesis, North Dakota State University, Dec. 1991, cited by others.*

* cited by examiner

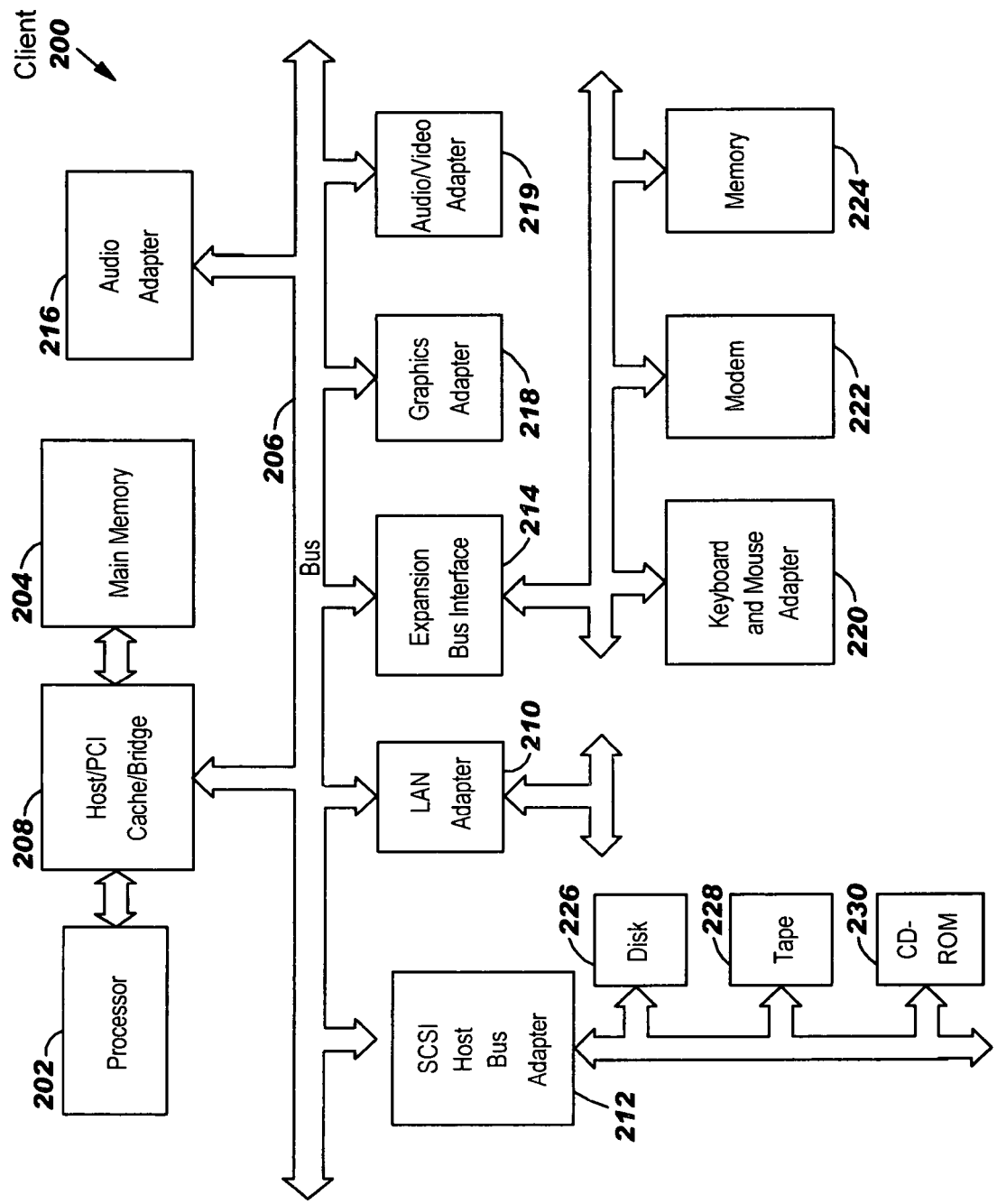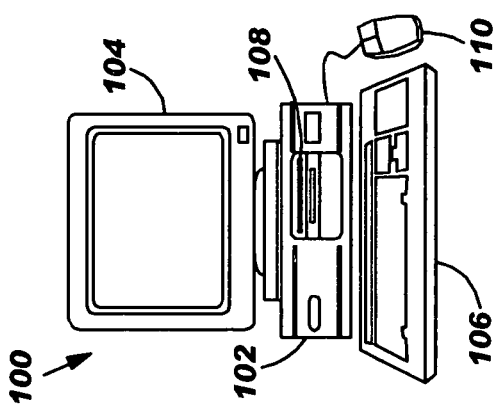

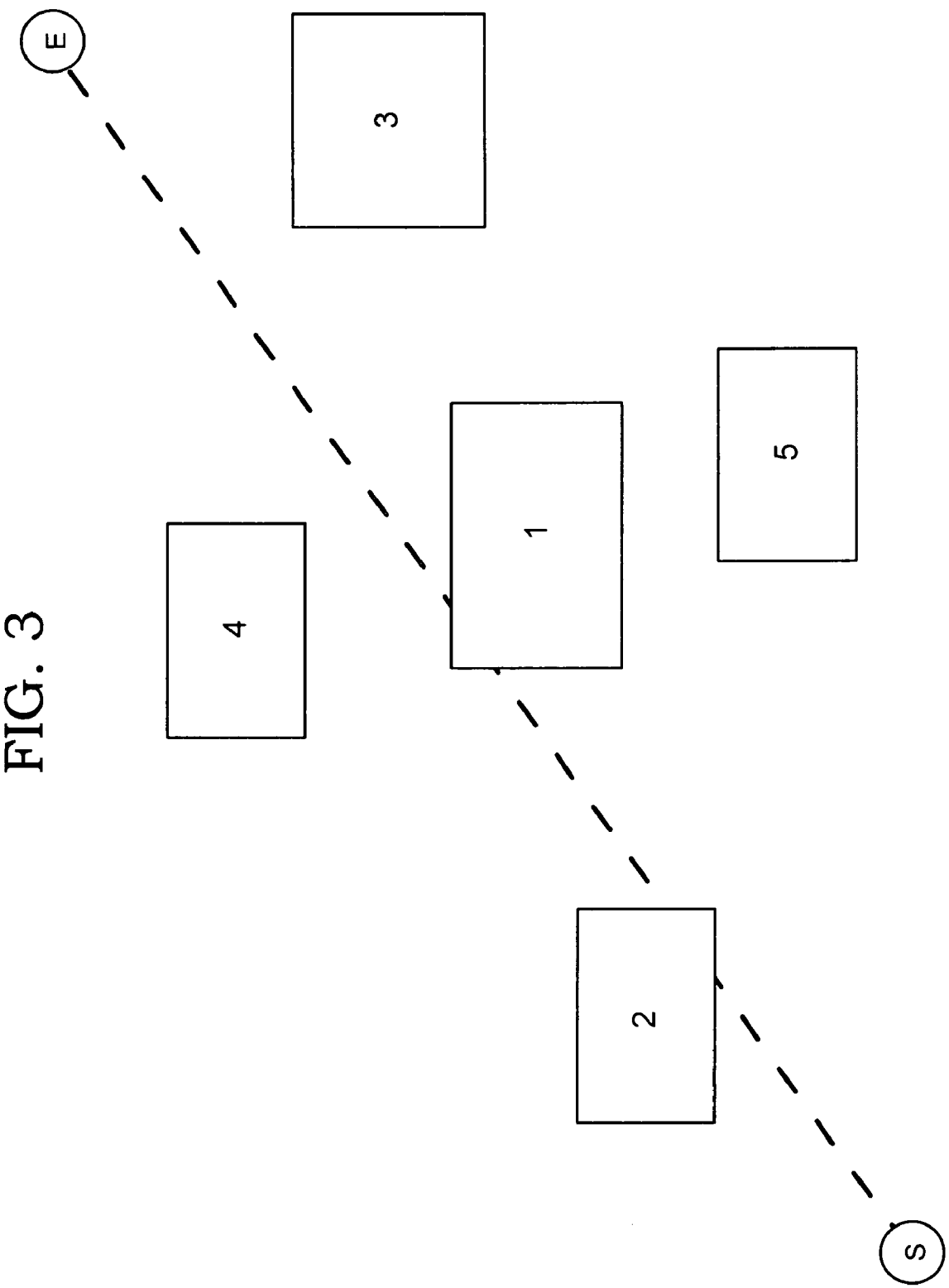

FIG. 12

```
PROCEDURE EMIT(PATH P,LIST result {
    For each vertex V in P
        For each Path Q which also goes though V
            Compare the angles of P and Q at V. If the angle of Q is smaller,,
then it comes before P. Therefore call EMIT (Q,result) recursively.
        END For
    END For
    Append P to result.
}

PREV(Path P,Vertex V) {
    If P is inverted, return the vertex which comes after V
    otherwise return the vertex which comes before V
}

// The technique for comparing two paths at a given vertex shared by both paths
PROCEDURE COMPARE(PathP, Path Q, Vertex V) {
    VAR Angle1=measure the angle of the points {PREV(P,V), V, and NEXT(P,V) }

VAR Angle2=measure the angle of the points {PREV(Q,V), V, and NEXT(Q,V) }
    return the comparison of Angle1 to Angle2;
}
```

METHOD FOR ROUTING MULTIPLE PATHS THROUGH POLYGONAL OBSTACLES

BACKGROUND OF THE INVENTION

1. Technical Field

The present invention relates generally to routing paths through polygonal objects. Particularly, the present invention relates to a method, system and computer program product for determining a non-intersecting path between two points, given a field of obstacles.

2. Description of Related Art

Finding the shortest, non-intersecting path between two points, given a field of obstacles, is a typical problem solved in many applications including manufacturing, robot motion planning and software design tools. An obstacle is a polygonal object to be avoided during the routing of a path. A polygonal object is a closed plane figure bounded by straight lines. Typically, a path is a line between two endpoints, the origin and the destination. The line is generated by routing the path according to certain goals. The path's route will consist of one or more straight-line segments. A segment is a straight line between points. Each point is either a vertex or an endpoint of a path. A vertex is one of the four corners of an obstacle.

However, the result of applying existing algorithms repeatedly to multiple paths in the same field of obstacles is often unacceptable and causes many problems. For example, several paths may converge at the same point, making it difficult to distinguish the original paths from each other.

Previous solutions for finding the shortest, non-intersecting path between two points, given a field of obstacles, begin with developing a reduced visibility graph of the obstacles and then determining the shortest path between two endpoints using Dijkstra's algorithm, which is well known in the field. In the case of multiple paths, the paths are offset from the obstacles and other paths. This means, however, that the paths no longer directly travel their computed shortest path from the reduced visibility graph. This gives rise to two major problems.

First, the offset paths may no longer be clear of intersections. The path has changed from what was originally computed and may now intersect new obstacles. It is therefore necessary to check the new offset line segments against intersections and compute a new solution. However, this can have a cascading effect as each new solution may encounter new obstacles and it may be necessary to repeat the check several times. Also, not only can new obstacles continue to intersect the modified lines, but the offset lines themselves may intersect each other, again causing new solutions to be calculated.

The second problem occurs when paths intersect multiple common vertices. In such a case, if the vertices are not ordered correctly, unnecessary crossed paths can occur.

Both of these problems are daunting and expensive, in terms of CPU usage, manpower, and overhead, to overcome. The conventional approach is to compare each path's vertex to every other path which goes through the same vertex. Often this comparison is not useful. Additionally, it is necessary to walk all the paths until a meaningful comparison can be made, which takes significant time and resources.

Therefore, it would be advantageous to have an improved method, system and computer program product for determining a non-intersecting path between two points, given a field of obstacles.

BRIEF SUMMARY OF THE INVENTION

The present invention provides a method, system and computer program product for routing multiple paths through polygonal obstacles. In a preferred embodiment, the method begins by offsetting the initial paths through the obstacles from the obstacles to form adjusted paths. If it is determined that any adjusted path encounters a new intersection, the adjusted path or paths are modified to form revised paths. The vertices of each obstacle are labeled. All the revised and all the adjusted paths are sorted. Then, according to their sorted order, the revised and the adjusted paths are reconstructed to form offset paths.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 is a pictorial representation of a data processing system in which the present invention may be implemented is depicted in accordance with a preferred embodiment of the present invention.

FIG. 2 is a block diagram of a data processing system is shown in which the present invention may be implemented.

FIG. 3 depicts a typical shortest path routing problem to be solved by the present invention.

FIG. 12 depicts an EMIT (path) procedure, in accordance with a preferred embodiment of the invention.

DETAILED DESCRIPTION OF THE INVENTION

Figure 4:
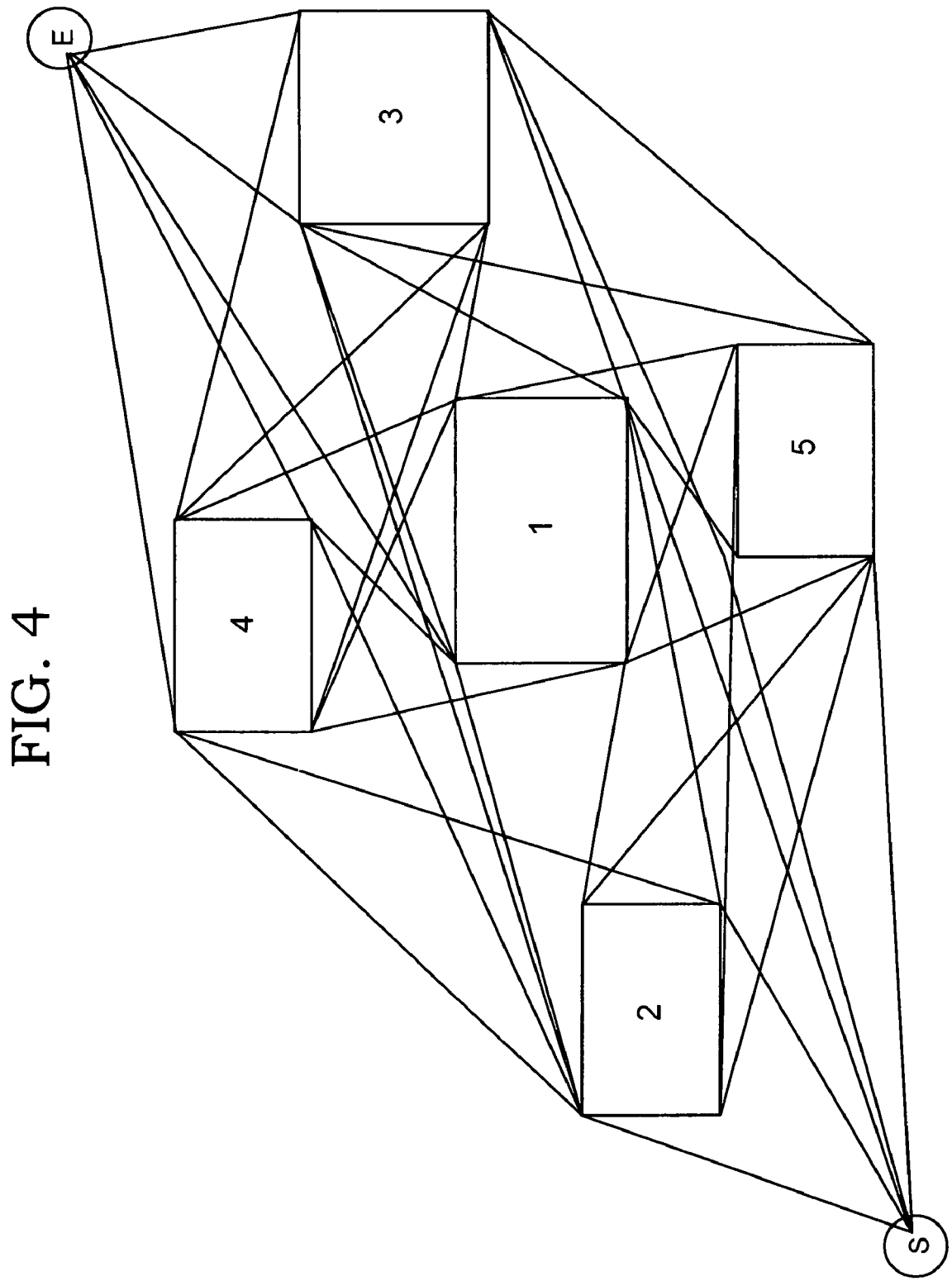
FIG. 4 is a diagram of a typical reduced visibility graph.

With reference now to the figures and in particular with reference to FIG. 1, a pictorial representation of a data processing system in which the present invention may be implemented is depicted in accordance with a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in connectors. In the depicted example, local area network (LAN) adapter 210, small computer system interface (SCSI) host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows XP, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230. In that case, the computer, to be properly called a client computer, includes some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226-230.

With reference now to FIG. 3, FIG. 3 depicts a typical path routing problem to be solved by the present invention. For the purposes of the present invention, a path is defined as a starting point and ending point, with a list of all the vertices the path goes through. S is the path starting point. E is the path end point. Obstacles 1-5 all present potential routing problems when determining the path between S and E.

FIG. 4 is a diagram of a typical reduced visibility graph. A reduced visibility graph, also known as a tangent graph, consists of line segments in free space connecting the starting point, the end point, and the vertices of all obstacles such that the segments are tangent to any obstacle they encounter. FIG. 4 is the reduced visibility graph for FIG. 3, showing all line segments connecting starting point S, endpoint E and the vertices of obstacles 1-5.

Figure 5:
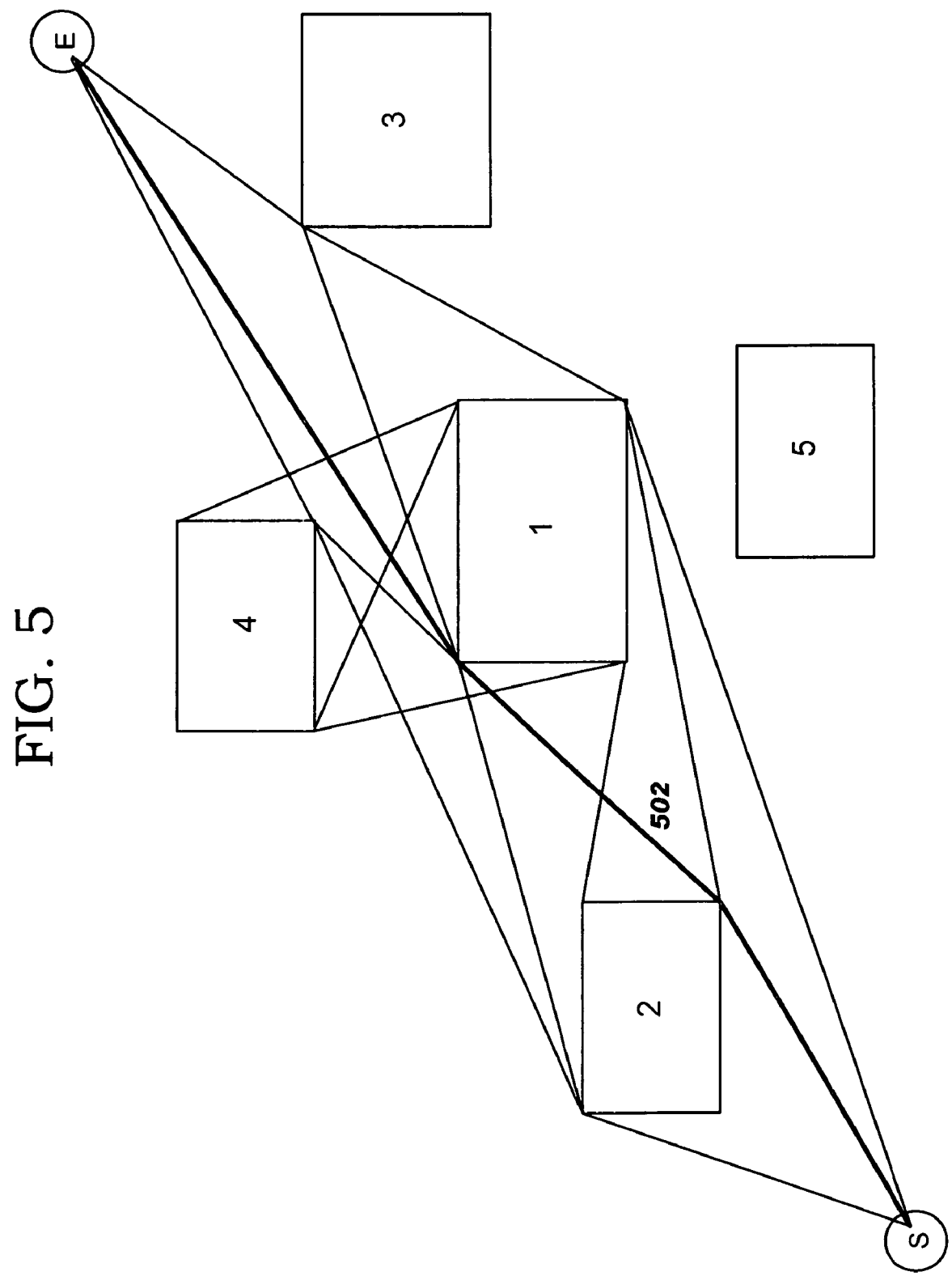
FIG. 5 is a diagram of a shortest path, as determined by Dijkstra's Algorithm.

Once all the possible paths are identified with the reduced visibility graph, the shortest path must be found. Dijkstra's Algorithm is then used to find an initial shortest path. FIG. 5 is a diagram of a shortest path, as determined by Dijkstra's Algorithm. Path 502 is the shortest path from starting point S to endpoint E that avoids obstacles 1-5, as determined by Dijkstra's Algorithm. Those skilled in the art will appreciate that other methods may be used to provide a set of paths through the obstacles, depending upon the particular implementation.

For example, in another embodiment, paths could be generated incrementally. That is, generating one segment at a time. Once an unknown obstacle is encountered, stop and queue that obstacle. If a known obstacle is encountered, throw out the segment. Then, generate segments for the next queues obstacle. Repeat the process with each segment. In another embodiment, an assumption is made that the solution will consist of a path that is only a certain percentage longer than the straight line distance between the starting and ending points. This percentage would vary with the implementation. This percentage would then define an ellipse containing the starting and ending points. Only solutions from within this defined area would be considered initially.

Figure 6:
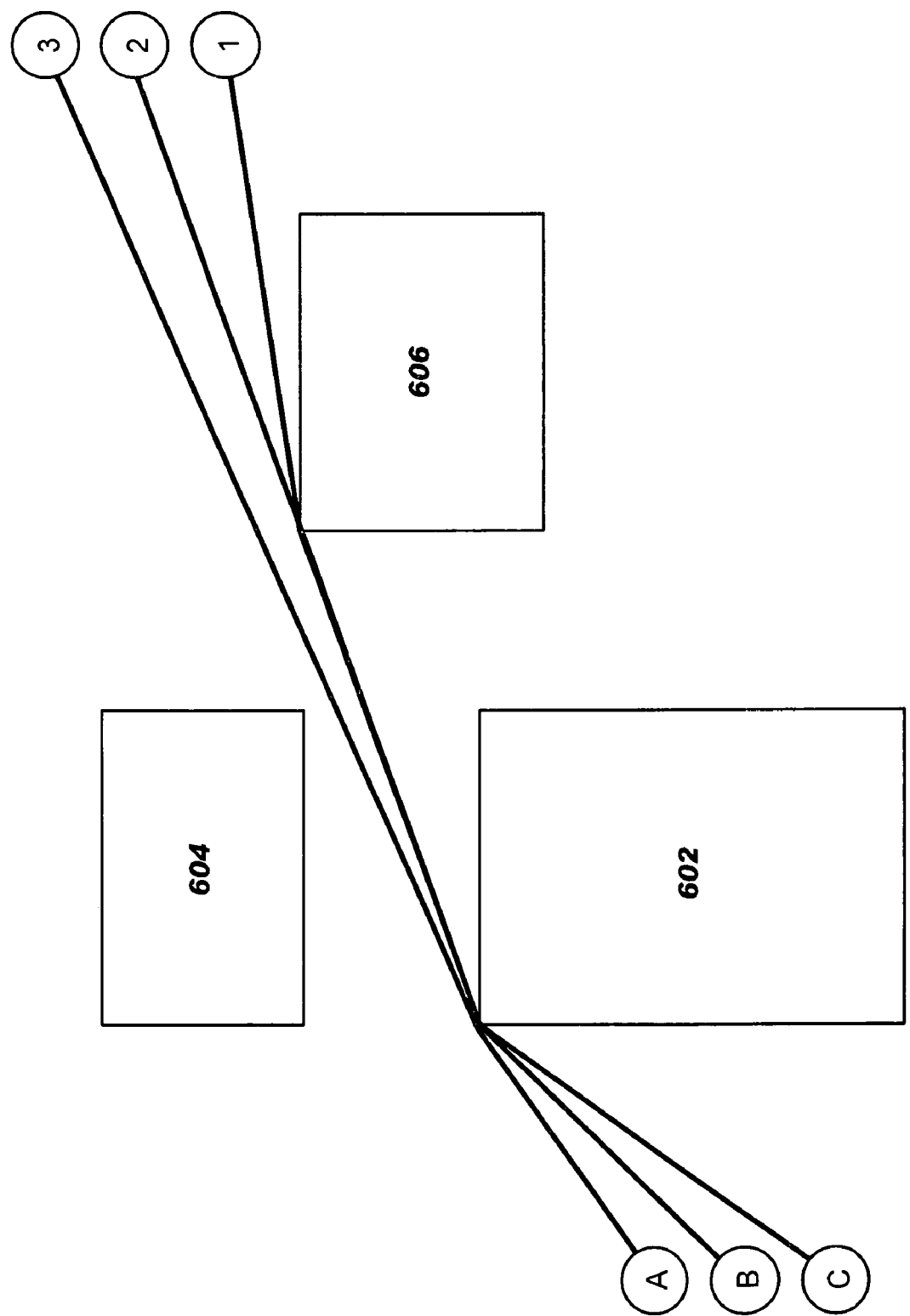
FIG. 6 is a diagram of three different paths, determined by Dijkstra's Algorithm, routed through the same set of obstacles.

However, a problem arises when several paths must traverse the same area. In such cases several paths may converge at the same point, making it difficult to tell the paths from one another, as depicted in FIG. 6. FIG. 6 is a diagram of three different paths, determined by Dijkstra's Algorithm routed through the same set of obstacles 602, 604, and 606. There are three different starting points, A, B, and C that are connected to three different endpoints, 1, 2 and 3. However, as illustrated by FIG. 6, when the paths converge at the vertices of obstacle 602, it becomes difficult or impossible to tell which starting point is connected to which endpoint. Also, between the vertices of obstacle 602 and 606, there appears to be only two paths, instead of three.

Figure 7:
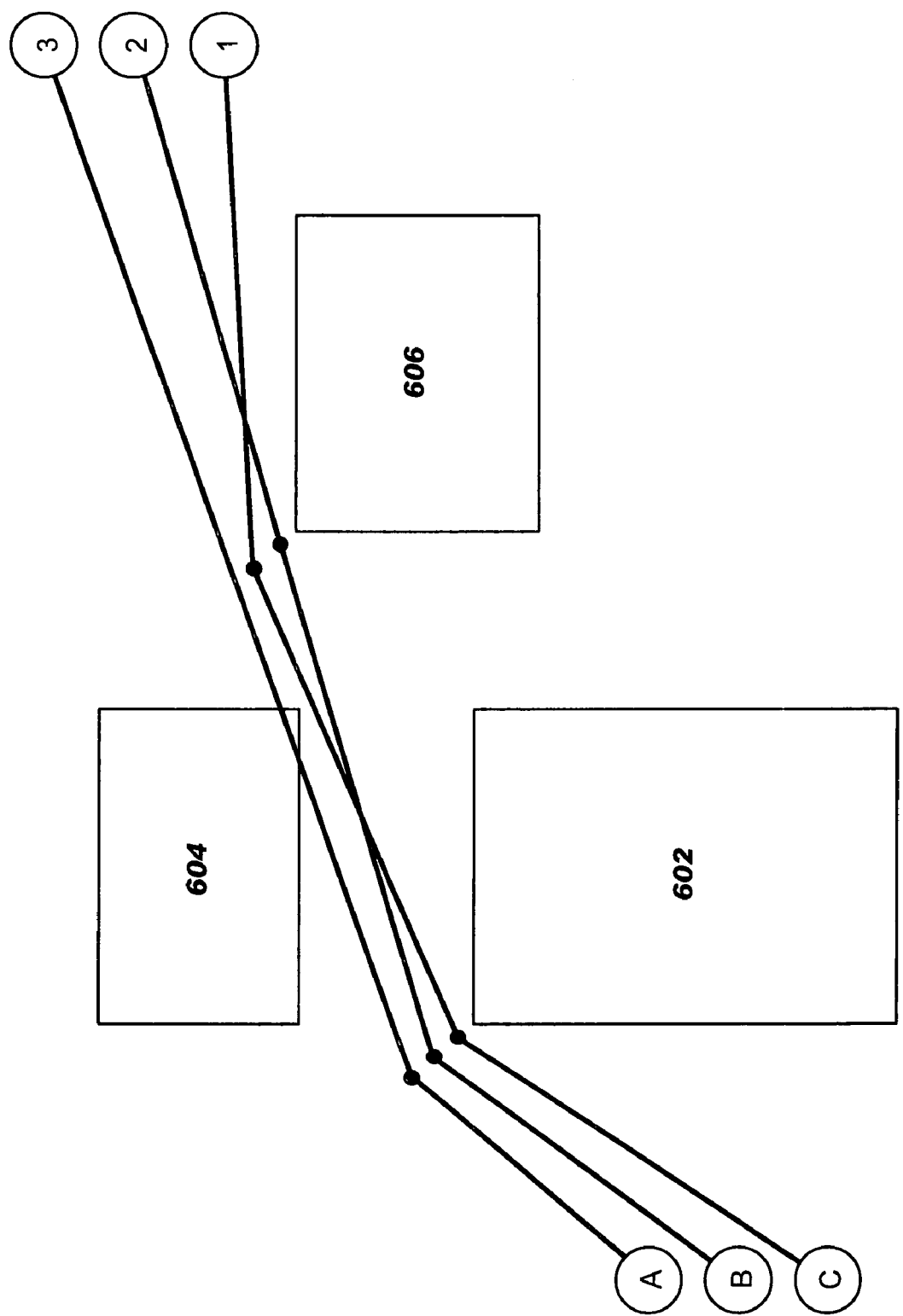
FIG. 7 is a diagram depicting the problems presented by incrementally offsetting paths determined by Dijkstra's Algorithm.

The present invention solves this problem by incrementally offsetting each path from each vertex. However, as shown in FIG. 7, this solution presents other problems. FIG. 7 is a diagram depicting the problems presented by incrementally offsetting paths determined by Dijkstra's Algorithm. For instance, the original path calculated by Dijkstra's Algorithm may no longer be valid. In the present example, due to its new offset, the path from A to 3 now crosses obstacle 604 and therefore a new solution must be found. Also, the paths from B to 2 and from C to 1 cross each other unnecessarily because of their offsets.

The present invention solves this problem by creating an offset region for each segment between two vertices. To create an offset region the shape of all obstacles are deformed to represent the offset area through which the paths will be traveling. In a preferred embodiment, the corner of the polygonal obstacle is extended by the total offset amount, which is based on how many paths go through that corner's vertex plus a constant. For example, if the offset amount was to be four 4 pixels, or what ever units are used, and 4 paths go through the vertex in question, then that vertex would be extended by sixteen pixels. In another embodiment, the paths' [varying] thicknesses could be accounted for. In alternate embodiments, the total offset amount might be based solely on how many paths go through that corner's vertex or it might be simply a constant amount.

Figure 8:
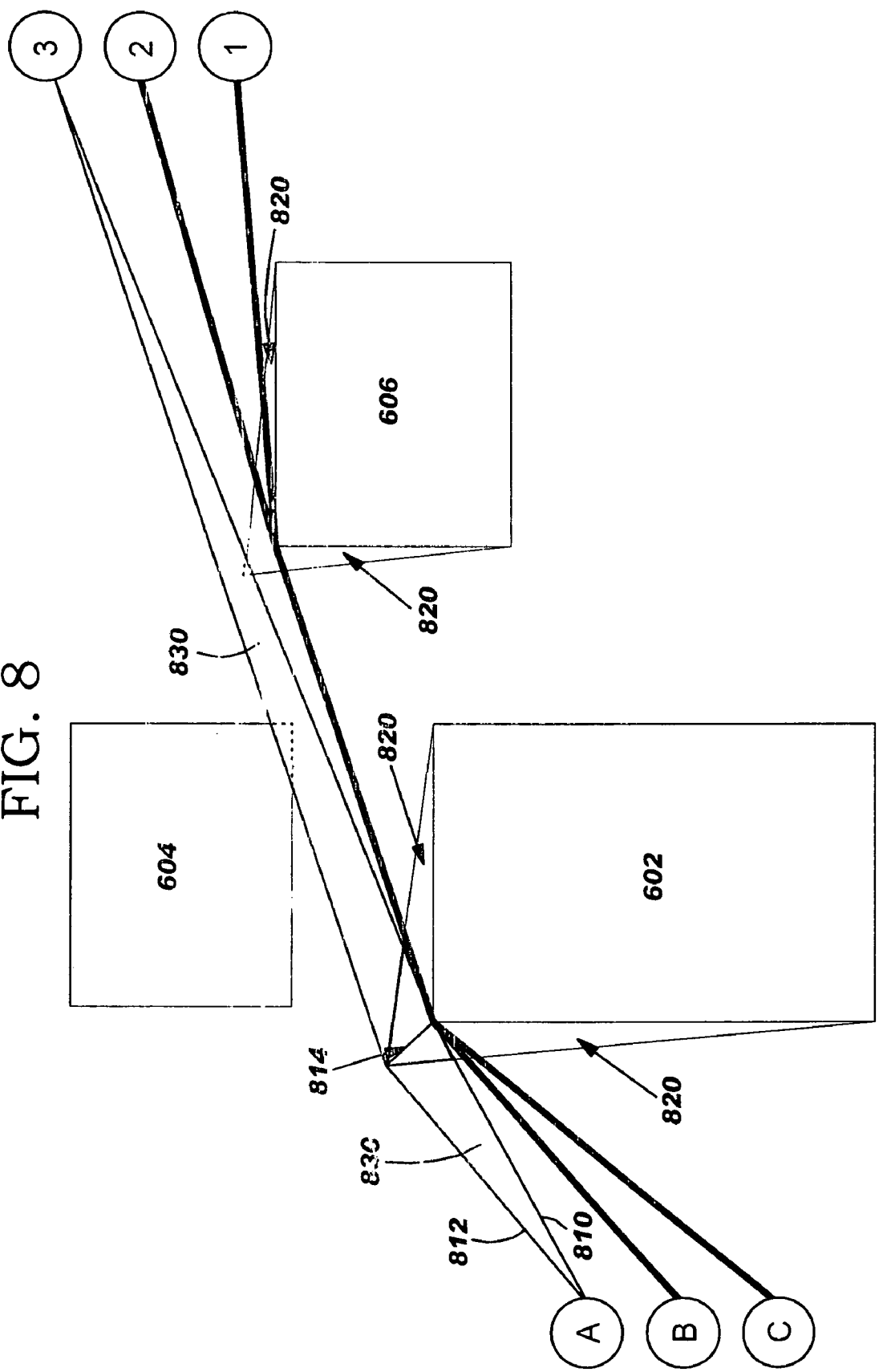
FIG. 8 is a block diagram of the offset region of a path from starting point A to endpoint 3, in accordance with a preferred embodiment of the invention.
Figure 9:
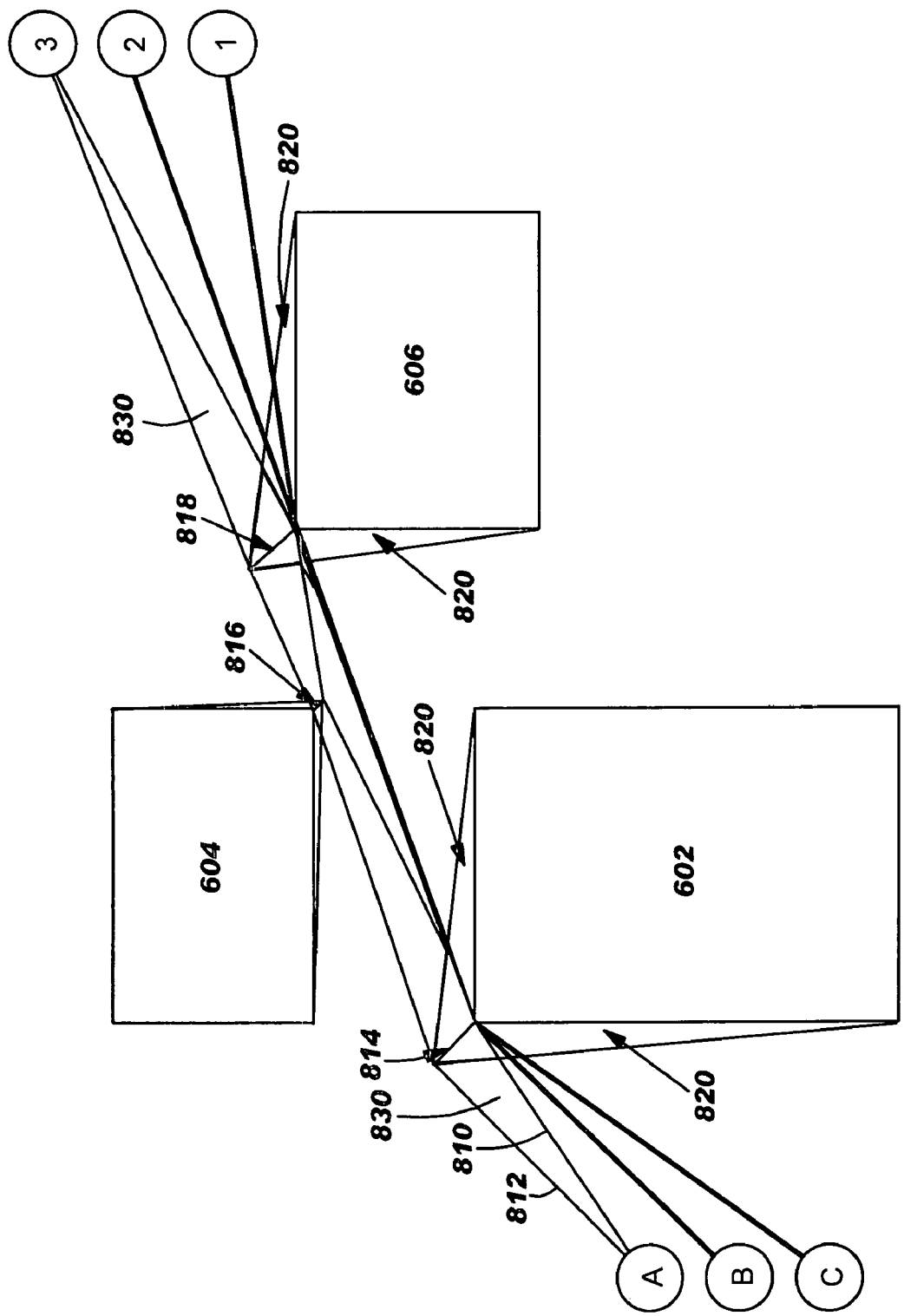
FIG. 9 is a block diagram of a subdivided segment, in accordance with a preferred embodiment of the invention.

For each segment in each path a segment offset region is generated. This region is defined by the original and deformed locations of the vertex at either end. This region is tested against the deformed obstacles for any new intersections. If one or more new intersections are detected, the segment is split into two or more new segments. For example, a method of subdividing a segment could be to insert a new point. This point is chosen from one of the four vertices from the obstacle which intersects the segment. In a preferred embodiment, the deformed obstacles encompass two diagonal lines forming an X. If the intersection is only with one of these two lines, then only the vertices from that line are chosen as the point at which to subdivide the segment. FIGS. 8 and 9 illustrate this process.

FIG. 8 is a block diagram of the offset region of a path from starting point A to endpoint 3, in accordance with a preferred embodiment of the invention. Path 810 is the original path as calculated using Dijkstra's Algorithm. Path 812 represents the proposed offset path from A to 3. Obstacles 602 and 606 have been deformed to show the offset area 820 through which the three paths, A to 3, B to 2, and C to 1 will pass. Line 814 represents the change between the original and deformed locations of the vertex at obstacle 602. The area between paths 810 and 812 represents the segment offset region 830. This region is then checked against obstacles to see if any new intersections occur. In the present example, segment offset region 830 encounters a new intersection with obstacle 604. Therefore the path must be subdivided and a new solution must be determined, as exemplified by FIG. 9.

FIG. 9 is a block diagram of a subdivided segment, in accordance with a preferred embodiment of the invention. The segment between obstacles 602 and 606 is divided by inserting the intersecting vertex of obstacle 604. All the obstacles and segments are then updated. Obstacle 604 is now also deformed to include the offset for paths traveling through its vertex. Line 816 represents the change between the original and deformed locations of the vertex at obstacle 604. Line 818 represents the change between the original and deformed locations of the vertex at obstacle 606. The new segment offset region 830 between paths 810 and 812 is tested for new intersections. In a preferred embodiment these steps are repeated a fixed number of times or until no new obstacles are found, whichever is smaller. This prevents the possible occurrence of an infinite loop. However, in alternate embodiments, these steps could be repeated a limited number of times.

Figure 10:
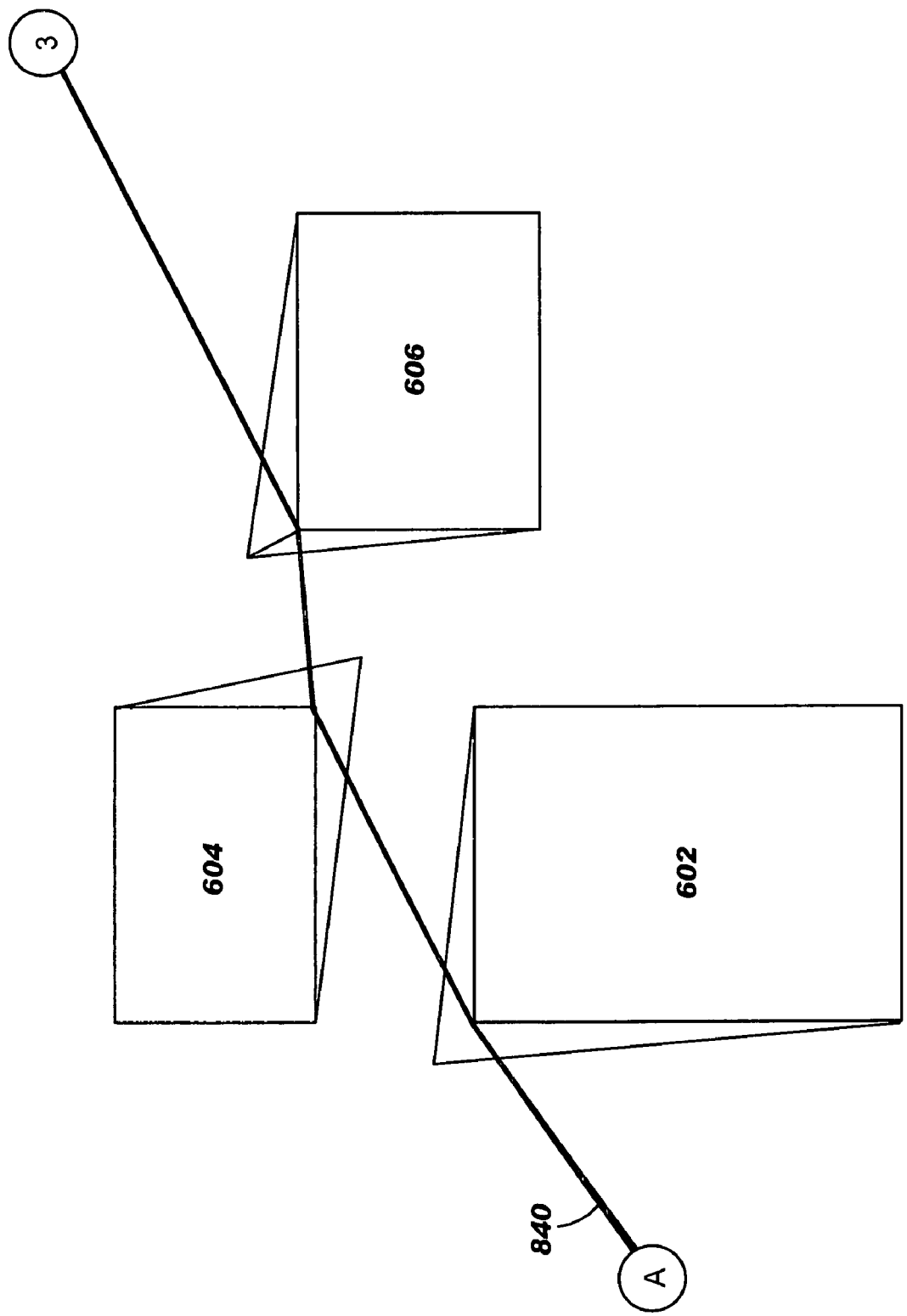
FIG. 10 is a block diagram of a modified path in accordance with a preferred embodiment of the invention.

FIG. 10 is a block diagram of a modified path in accordance with a preferred embodiment of the invention. Path 840 represents the modified path between starting point A and endpoint 3, taking into account all obstacles in the path and the offset for all other paths passing through the same vertices.

The second problem caused by offsetting, and illustrated in FIG. 7, is unnecessary crossing. The present invention solves this problem through use of a labeling system. Each vertex in a solution for a path is labeled either as an IN or OUT vertex. This corresponds to the way the paths will be offset from the vertex after a sorting order is determined. In an IN vertex, paths are offset from the inside-out. In an OUT vertex, paths start on the outside and are offset inwards. A vertex is labeled IN due to the fact the path passes through that vertex such that the obstacles is on its right side. If a second path passes through that vertex such that the obstacle in on its left, then that path's orientation is temporarily inverted so that it agrees with the first path.

Once all vertices have been labeled, it is possible to compare any two paths which pass through the same vertex. A path goes through the vertex when it has two segments containing that vertex. The angle at which the segments meet will determine the comparison. The path containing the smaller angle precedes (that is, it should be offset prior to) the path with a larger angle. If the angles are equal, no comparison can be made.

All angles are measured using the right-hand rule, in a counter-clockwise direction, starting from the segment that is closer to the starting point of the path. When comparing either IN or OUT vertices, the smaller angle is offset before a larger one. By measuring the angles any time two paths share a vertex, a partial ordering for the set of paths could be generated. The ordering may contain cycles, meaning that the paths in the cycle will cross each other no matter what ordering is used. In such a case, the cycle is broken up front based on the order in which the paths and segments are iterated.

The advantage of this method of labeling the vertices is that the proper labeling of vertices allows for one global ordering of the paths to be used. The first path in this global ordering is also the first path to be offset at every vertex through which it passes. The fact that labeling yields the correct results simplifies the ordering step. For example, if Path A comes before path B at a particular vertex V, then there is no reason to compare the two paths at any other vertex, because path A will always come before path B, or at most they cross exactly one time. This allows for a topological sorting of all the paths to be generated quickly.

In contrast, prior solutions would require a determination of an offset ordering for each set of paths going through a given vertex. A complex sort is also required, which often results in traversing segments and comparing neighboring vertices for a given pair of paths. This is because it is common that two or more paths share a common sequence of vertices, which means making a comparison often requires finding the vertices at which they diverge.

FIGS. 11 A and B illustrate a flowchart of the process of labeling the vertices of the paths, in accordance with a preferred embodiment of the invention. The process begins with creating a STACK, which is initially empty (step 1102). This stack will contain the set of all the paths, ALL PATHS. All the paths are set to being unlabeled and not inverted and not agreeing, P.LABELED equals false and P.INVERTED equals false and P.AGREE equals false (step 1104). All vertices are set to unlabeled, V.LABELED equals false (step 1106). Push all paths onto the STACK (step 1108). Determine if the STACK is empty (step 1110). If the STACK is empty (a yes output to step 1110), then end. If the STACK is not empty (a no output to step 1110), pop the top path from the STACK into variable P, this removes the path from the top of the stack and assigns it to P (step 1112). Check to see if the path has already been labeled (step 1116). If the path has been labeled, (a yes output to step 1116), repeat step 1110. If the path has not already been labeled (a no output to step 1116), set the variable P.LABELED to true for this path (step 1118). Each vertex in the path must then be checked, excluding the first and last points. Determine if there are other paths which touch vertex V (step 1120). If no other paths touch vertex V (a no output to step 1120), then set variable P.TOUCHED to false for path P (step 1122).

If another path does touch vertex V (a yes output to step 1120), set P.TOUCHED equal to true (step 1124). Determine if P.LABELED equals false for the touched path (step 1126). If P.LABELED does not equal false (a no output to step 1126), then determine if another path is touching vertex V (step 1128). If no other path is touching vertex V (a no output to step 1128), then go to step 1134. If another path does touch vertex V (a yes output to step 1128) then repeat step 1126. If P.LABELED does equal false (a yes output to step 1126), then determine if P.TOUCHED equals false for the touched path (step 1130). If P.TOUCHED does not equal false (a no output to step 1130), then go to step 1128. If P.TOUCHED does equal false (a yes output to step 1130), then push this path to the top of the STACK (step 1132). Determine if another path is touching vertex V (step 1128).

Determine if vertex V is unlabeled (step 1134). If vertex V is unlabeled (a yes output to step 1134), then determine if vertex V's obstacle is on the right side of path P (step 1136). If the obstacle is on the right side of path P (a yes output to step 1136), then determine if path P in inverted (step 1138). If path P is not inverted (a no output to step 1138), then set V.LABELED equals IN (step 1140). Get the next vertex V in path P (step 1160). If path P is inverted (a yes output to step 1138), then set V.LABELED equals OUT (step 1142). Get the next vertex V in path P (step 1160). If the obstacle is not on the right side of Path P (a no output to step 1136), determine if path P is inverted (step 1144). If path P is not inverted (a no output to step 1144) set V.LABELED equals OUT (step 1146). Get the next vertex in path P (step 1160). If path P is inverted (a yes output to step 1144), set V.LABELED equals IN (step 1148). Get the next vertex in path P (step 1160).

If vertex V is labeled (a no output to step 1134) determine if path P agrees with the IN or OUT label already assigned (step 1150). Calculate the desired label using the same approach as described above. If vertex V's obstacle is on the right side of path P, vertex V will have a desired label of IN, unless path P is inverted, in which case the desired label will be OUT. If vertex V's obstacle is on the left side of path P, vertex V will have a desired label of OUT, unless path P is inverted, in which case the desired label will be IN. If the desired label matches the existing label (a yes output to step 1150), set P.AGREE to true (step 1152). Get the next vertex in path P (step 1160).

If the desired label does not match the current label (a no output to step 1150), determine if path P is inverted (step 1154). If path P is not inverted (a no output to step 1154), determine if P.AGREE equals false (step 1156). If P.AGREE equals false (a yes output to step 1156), then invert path P (step 1158). To invert path P, set P.INVERTED to true and iterate through all vertices of path P up until the current one and flip-flop their labels. That is, change IN to OUT and OUT to IN. Since P.AGREE was false, this can not affect other, previously labeled paths. Get the next vertex in path P (step 1160).

If P.AGREE does not equal false (a no output to step 1156), then divide path P into two subpaths at this vertex V. Path P is divided into two paths at this vertex, so that the new subpath contains the new vertex as its second vertex, the previous vertex is its starting point and path P now terminates at this vertex (step 1162). The two subpaths overlap, meaning they share a common segment, containing two vertices. The newly created subpath contains all the remaining vertices of the original path P. This new subpath is then pushed to the top of STACK so that it will be labeled next (step 1164). The subpath is added to the set of ALL PATHS (step 1166). Repeat step 1110.

If path P is already inverted (a yes output to step 1154), then divide path P into two subpaths at this vertex V. Path P is divided into two paths at this vertex, so that the new subpath contains the new vertex as its second vertex, the previous vertex is its starting point and path P now terminates at this vertex (step 1162). The two subpaths overlap, meaning they share a common segment, containing two vertices. The newly created subpath contains all the remaining vertices of the original path P. This new subpath is then pushed to the top of STACK so that it will be labeled next (step 1164). The subpath is added to the set of ALL PATHS (step 1166). Repeat step 1110.

Figure 11A:
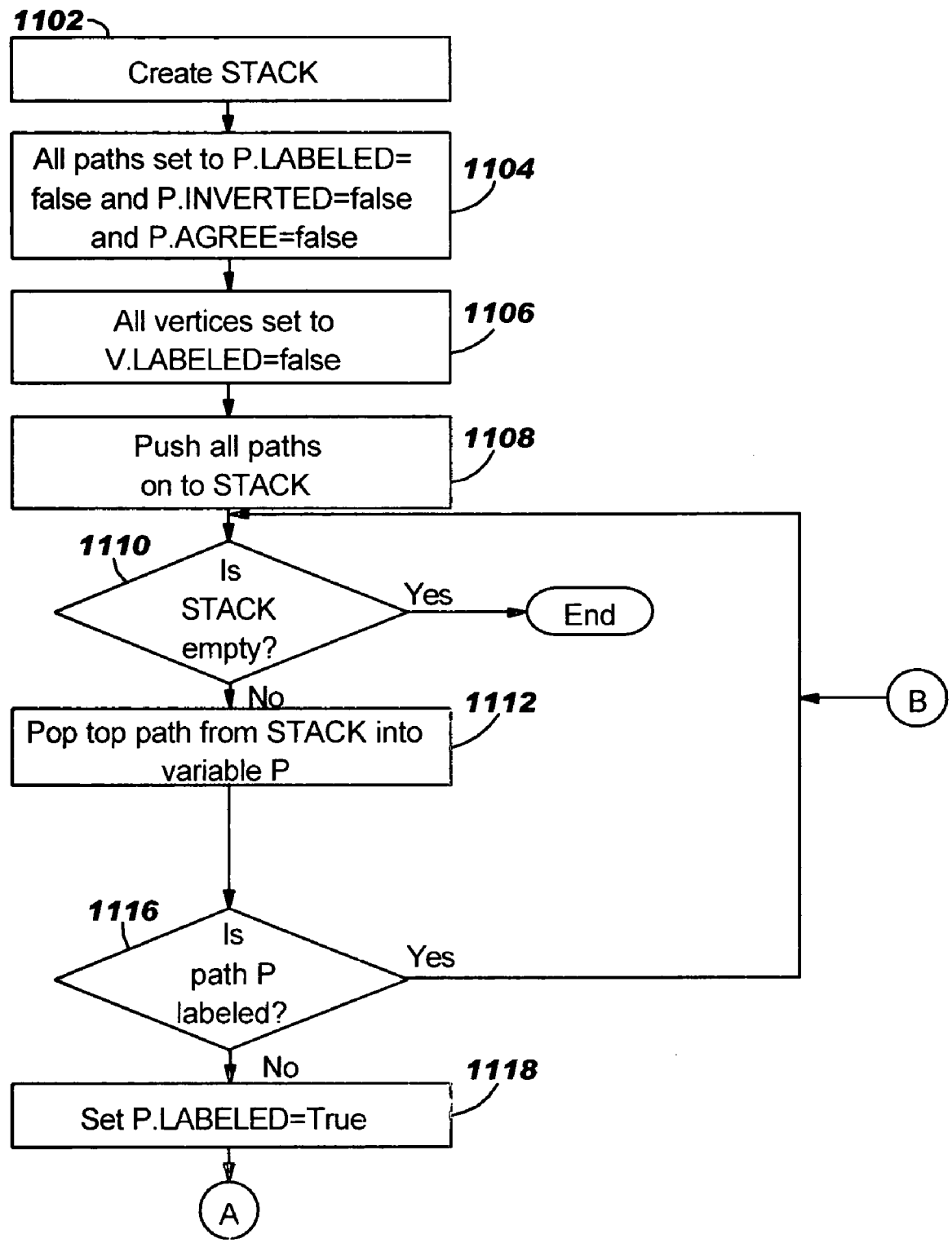
FIGS. 11 A and B illustrate a flowchart of the process of labeling the vertices of the paths, in accordance with a preferred embodiment of the invention.
Figure 11B:
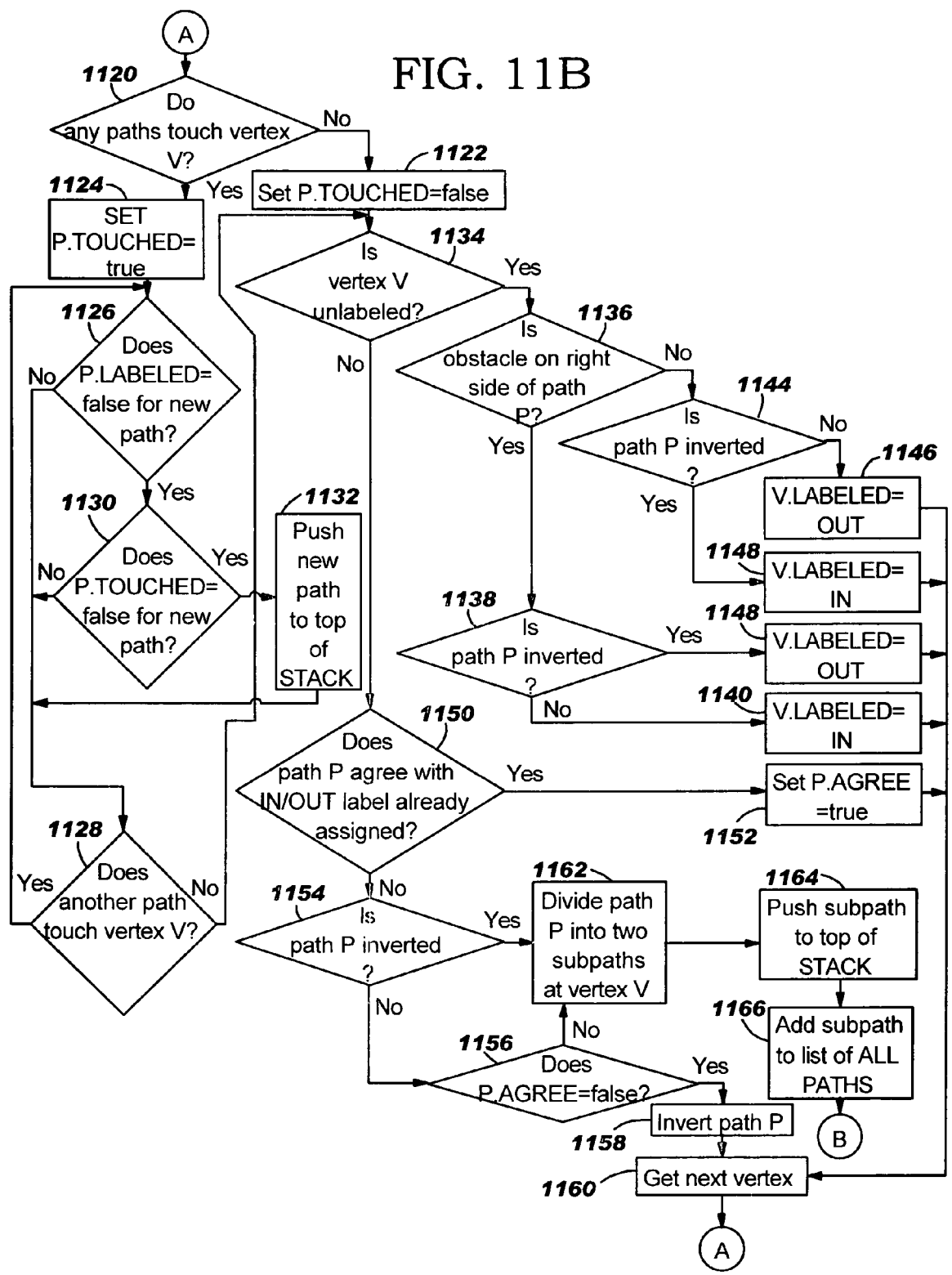

Those of ordinary skill in the art will appreciate that the steps detailed in FIGS. 11A and 11B may vary. For example, other steps, such as steps to verify whether or not the point being examined is a beginning or endpoint may be used in addition to those steps already included. IN an alternate embodiment, paths could be implemented that contains a BENDS collection, which are just the vertices in the middle of the path, which would exclude the starting and ending points. In another embodiment, the variable P.TOUCHED might be omitted, as it might not be important something has been previously been touched. If it is touched again, it could simply be pushed onto the STACK again and again.

FIG. 12 depicts an EMIT (path) procedure, in accordance with a preferred embodiment of the invention. For any two paths it is possible to compare those two paths at one or more shared vertices. The comparison is based on the angle at which the path goes through the vertex, and the vertex's label. A partially ordered set (POSET) is created from all paths using this comparison technique. This ordering may contain cycles, and if it does they may be arbitrarily broken. A topological sort is generated by doing a depth first post-order traversal of the POSET. To generate the ordered list, for any given path, all remaining paths which precede the current path need to be EMITTED prior to adding the given path. Recursion must be used, or a stack which simulates recursion. In order to emit a path, for each path, and for each vertex in that path, obtain the other remaining paths which share that vertex. Compare the paths, one at a time, to the current path at that vertex by use of the angle measurement technique, discussed above, and EMIT the other path first if that path precedes the current path being processed. This other path may have paths which precede it as well, hence recursion. Once a path has been successfully EMITTED, it is no longer compared with coincidental paths.

Figure 13:
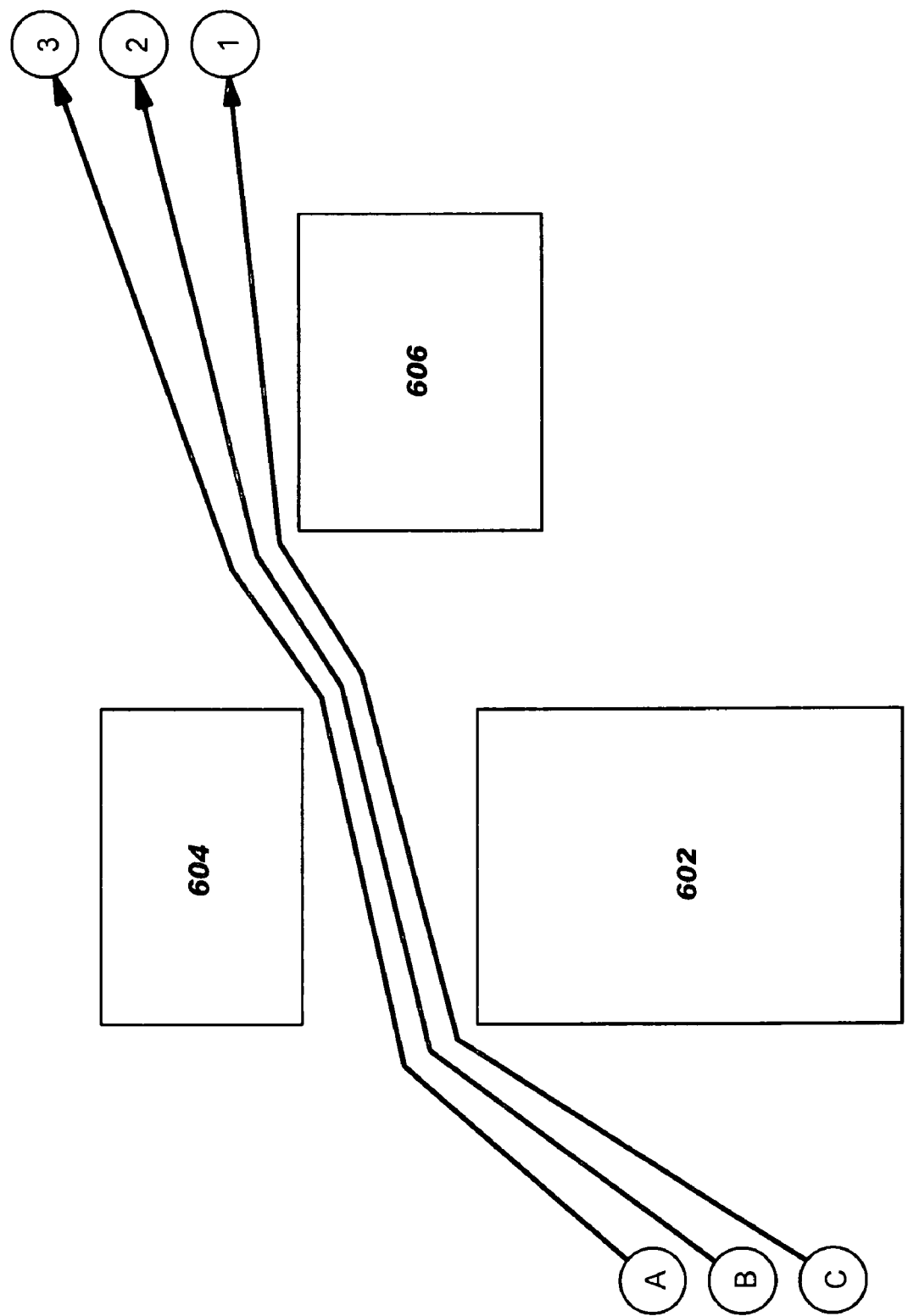
FIG. 13 is a block diagram of a modified, topologically sorted, offset and rebuilt paths, in accordance with a preferred embodiment of the invention.

Once this process has been done for all paths, a global ordering of the paths exists. Iterate over the paths in order and offset their bend points at each vertex. For vertices labeled IN, offset the paths starting closest to the vertex. For vertices labeled out, offset the paths starting at the furthest point from the vertex. The furthest point is already know and is based on how many paths went through that vertex. For all paths that were split into subpaths and subpaths that were re-split into additional subpaths, rebuild the original path using a bottom-up reassembly of the constituent pieces. FIG. 13 is an example of the resulting augmented, topologically sorted, offset and rebuilt paths.

FIG. 13 is a block diagram of a modified, topologically sorted, offset and rebuilt paths, in accordance with a preferred embodiment of the invention. FIG. 13 shows the three paths, A to 3, B to 2, and C to 1 routed through the same set of obstacles 602, 604, and 606, from FIG. 6, as they would appear after having been offset, modified for new intersections, topologically sorted and rebuilt.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-implemented method, for routing multiple paths through polygonal obstacles, the method comprising:
    offsetting initial paths from obstacles to form adjusted paths;
    responsive to a determination that the adjusted paths encounter new intersections, modifying the adjusted paths to form revised paths;
    sorting all the revised and all the adjusted paths; and
    reconstructing the revised and the adjusted paths according to a sorted order to form offset paths.

2. The computer-implemented method of claim 1, wherein the step of determining that the adjusted paths encounter new intersections comprises:
    comparing an offset area for each obstacle against a segment offset region, wherein the offset area for each obstacle is the area created by deforming the shape of the obstacles to represent the offset area through which the adjusted paths will be traveling, and wherein the segment offset region is defined by the locations of the original and deformed vertex at either end.

3. The computer-implemented method of claim 2, wherein the step of modifying the adjusted paths to form revised paths, comprises:
    splitting a segment into two or more new segments.

4. The computer-implemented method of claim 3, wherein the segment is split into two or more new segments by adding a point that is chosen from one of the four vertices of the obstacle that intersected the segment.

5. The computer-implemented method of claim 4, wherein the offset area encompasses two diagonal lines forming an X and wherein only vertices from a line intersected by the obstacle may be used as the point at which to split the segment.

6. The computer-implemented method of claim 1, further comprising:
    labeling vertices of each obstacle.

7. The computer-implemented method of claim 6, wherein each vertex encountered by each revised or adjusted path is labeled either IN or OUT.

8. The computer-implemented method of claim 7, wherein if a vertex's obstacle is to the right side of the revised or adjusted path, the vertex will be labeled IN, or, if the revised or adjusted path is inverted, the vertex will be labeled OUT, and wherein if a vertex's obstacle is to the left side of the revised or adjusted path, the vertex will be labeled OUT, or, if the revised or adjusted path is inverted, the vertex will be labeled IN.

9. The computer-implemented method of claim 1, wherein the step of sorting all the revised and all the adjusted paths comprises:
    comparing the revised and the adjusted paths at one or more shared vertices, wherein the comparison is based on the vertex's label and the angle at which the revised or adjusted path goes through the vertex.

10. The computer-implemented method of claim 9, wherein all angles are measured using the right-hand rule, in a counter-clockwise direction, starting from the segment that is closer to the starting point of the revised or adjusted path.

11. The computer-implemented method of claim 7, wherein the step of sorting all the revised and all the adjusted paths comprises:
    comparing the revised and the adjusted paths at one or more shared vertices, wherein the comparison is based on the vertex's label and the angle at which the revised or adjusted path goes through the vertex.

12. The computer-implemented method of claim 11, wherein all angles are measured using the right-hand rule, in a counter-clockwise direction, starting from the segment that is closer to the starting point of the revised or adjusted path.

13. The computer-implemented method of claim 12, further comprising:
    iterating over the revised and the adjusted paths in order; and
    offsetting the revised or adjusted path's bend point at each vertex.

14. The computer-implemented method of claim 13, further comprising:

responsive to vertices being labeled IN, offsetting the revised and the adjusted paths starting closest to the vertex; and responsive to vertices being labeled OUT, offsetting the revised and the adjusted paths starting at the point furthest from the vertex.

15. The computer-implemented method of claim 1, further comprising:

generating initial paths through a set of obstacles.

16. The computer-implemented method of claim 15, wherein the initial paths are generated incrementally.

17. The computer-implemented method of claim 15, wherein the step of generating the initial paths comprises creating an ellipse containing the starting and ending points of the initial path, wherein the boundaries of the ellipse are determined by multiplying the length of the straight line between the starting and ending point of the initial path by a certain percentage.

* * * * *